Nov. 7, 1933.  D. R. DUPUIS ET AL  1,933,896
HEADLIGHT CONSTRUCTION
Filed June 20, 1931   3 Sheets-Sheet 1
Fig. 1.
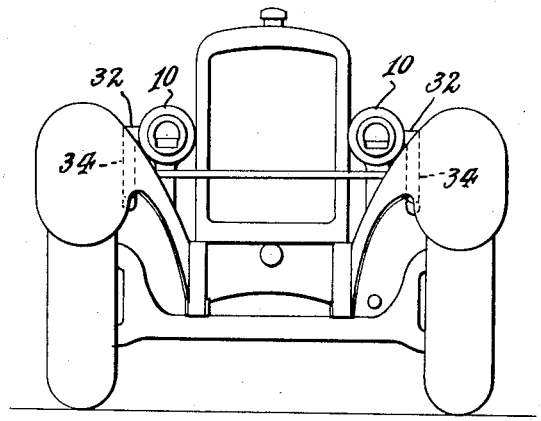
Fig. 2.
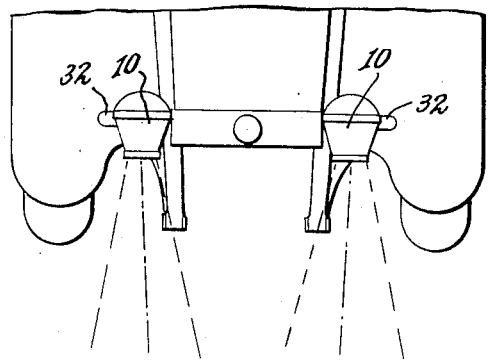
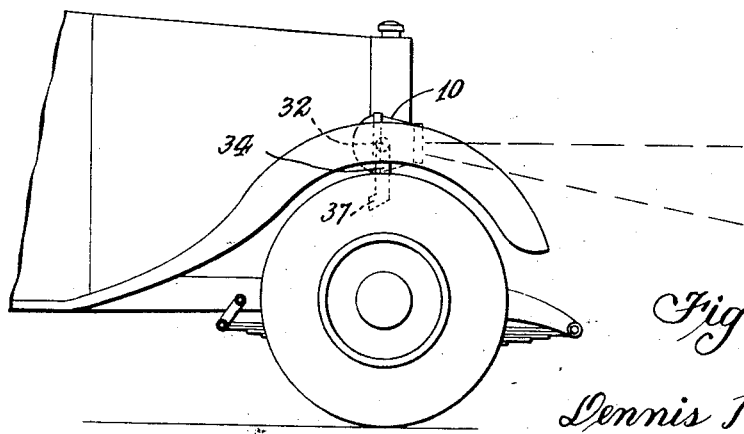
Fig. 3.
Inventors
Dennis R. Dupuis
Elwin W. Peterson
By Lyon & Lyon
Attorneys Nov. 7, 1933.   D. R. DUPUIS ET AL   1,933,896
HEADLIGHT CONSTRUCTION
Filed June 20, 1931   3 Sheets-Sheet 2
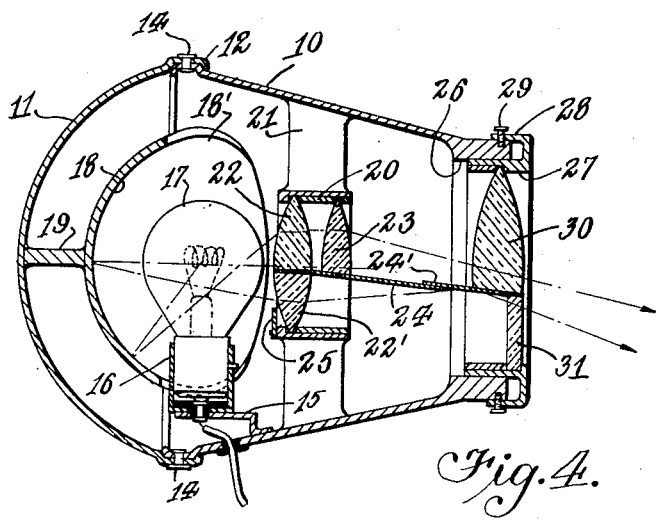
Fig. 4.
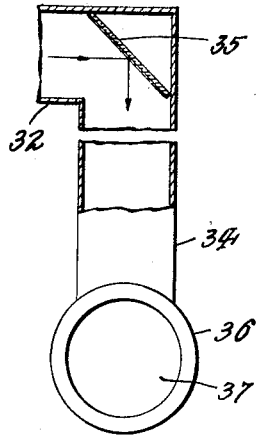
Fig. 6.
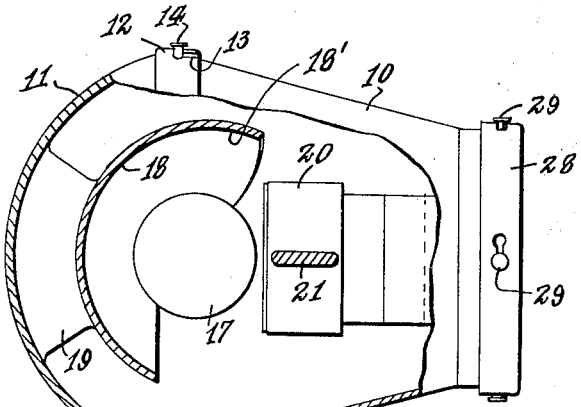
Fig. 5.
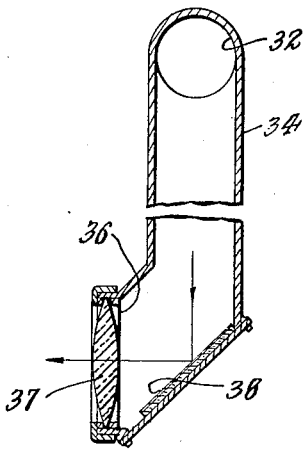
Fig. 7.
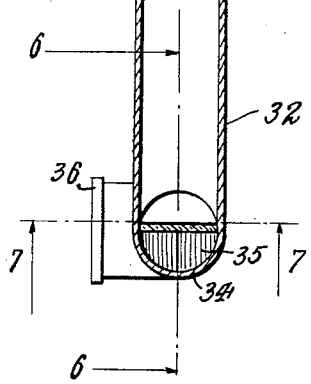
Inventors
Dennis R. Dupuis
Elwin N. Peterson
By Lyon & Lyon
Attorneys Nov. 7, 1933.  D. R. DUPUIS ET AL  1,933,896
HEADLIGHT CONSTRUCTION
Filed June 20, 1931   3 Sheets-Sheet 3
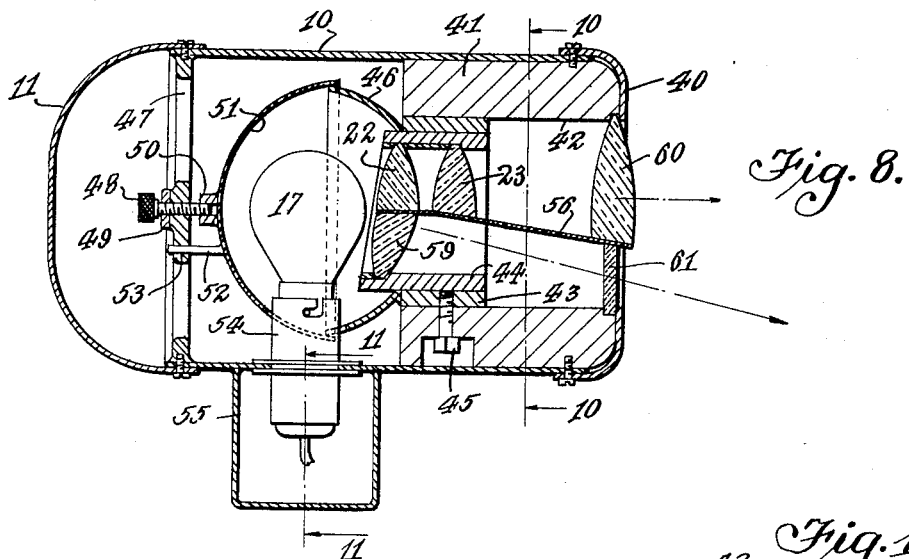
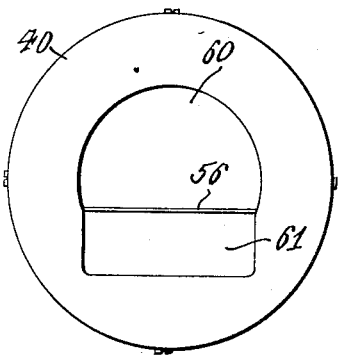
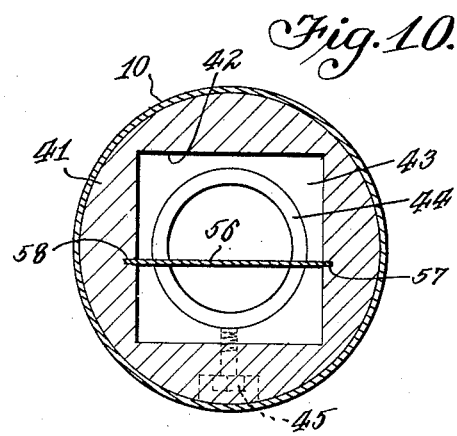
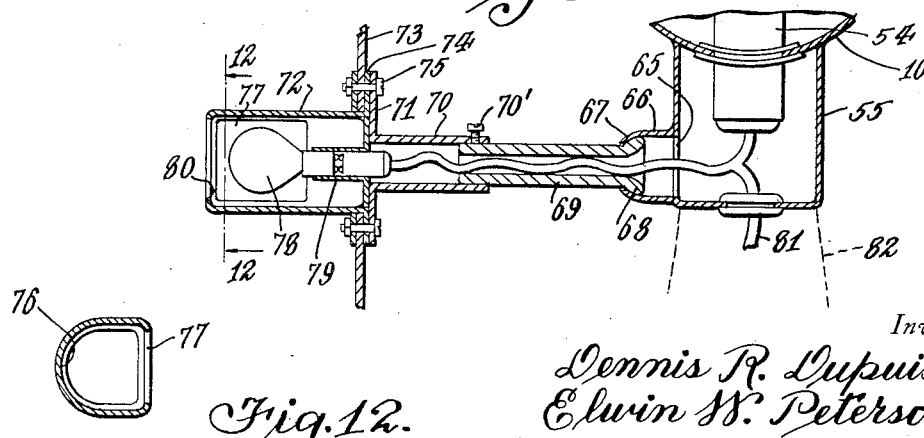
Inventors
Dennis R. Dupuis
Elwin W. Peterson
By Lyon & Lyon
Attorneys Patented Nov. 7, 1933

1,933,896

UNITED STATES PATENT OFFICE 1,933,896

HEADLIGHT CONSTRUCTION

Dennis R. Dupuis, Santa Monica, and Elwin W. Peterson, Alhambra, Calif.; said Peterson assignor to said Dupuis Application June 20, 1931. Serial No. 545,638

5 Claims. (Cl. 240—7.1)

This invention relates to an improved headlight construction particularly adapted for use on vehicles such as automobiles, trucks, boats, aerial vehicles, etc., and has for its general object the provision of means whereby the light emanating from a given source is most effectively distributed over a roadway and prevented from being directed upwardly, thereby obviating the possibility of drivers of approaching vehicles from being partially blinded by the light. The headlight or searchlight of this invention is also particularly adapted to the illumination of landing fields for aircraft.

It is generally understood that the majority of accidents involving automobiles and other vehicles occurring at night, are caused by the partial blinding effect due to light emanating from the illuminating means of approaching vehicles.

Although normally the headlights of automobiles and the like are so directed as to throw the major portion of the light on the road, still headlights have generally been so constructed heretofore as to throw an appreciable quantity of light in all directions so that the glare from the headlights extends to an appreciable height and interferes with the vision of drivers of approaching vehicles. Furthermore, the headlights of the prior art have been provided with emission lenses of rather large diameter and at a distance of say 50 feet, a person standing 20 feet to one side of the optical axis of a normal headlight will still receive a sufficient quantity of light so as to be partially blinded. Under these circumstances, it is impossible to determine whether the vehicle is a narrow passenger automobile or a very wide truck; in other words, it is impossible to estimate the width of the vehicle as the body of the vehicle is generally in complete darkness emphasized by the glaring effect of the headlights.

It is an object of this invention to disclose and provide means for illuminating vehicles whereby the difficulties of the prior illuminating means are entirely obviated.

An object of this invention is to disclose and provide means whereby an intense diverging beam of light is emitted from a relatively small emission lens.

Another object is to disclose and provide an illuminating means whereby the light is effectively prevented from passing upwardly above a predetermined plane.

A further object is to provide an illuminating means for vehicles capable of properly illuminating a roadway and objects up to a height of say 4 feet but incapable of causing light to be directed at objects above such predetermined height, unless such higher illumination is desired.

A still further object of this invention is to disclose and provide means for illuminating the lower portions of vehicles so as to form a silhouette of the marginal edges of the vehicle and thus permit the driver of an approaching vehicle to readily ascertain and know the precise width of the vehicle.

A still further object is to provide a combination of elements whereby light from a suitable source is most effectively directed in the illumination of a roadway.

Another object is to disclose and provide a headlight capable of employing a high intensity light source without producing a undesirable glare which would interfere with the drivers of approaching vehicles.

These and other objects, uses and advantages of this invention will become apparent to those skilled in the art from the subsequent description of two preferred forms of the invention. It is to be understood that the embodiments of the invention described hereinafter and shown on the appended drawings are merely illustrative of the invention and is not to be considered as limiting.

In describing the invention, reference will be had to the appended drawings, in which:

Fig. 1 is a front view of an automobile provided with headlights made in accordance with this invention.

Figs. 2 and 3 are plan and side views respectively of the vehicle shown in Fig. 1.

Fig. 4 is an enlarged longitudinal section through one form of headlight embracing this invention.

Fig. 5 is a plan view partly broken away of the headlight shown in Fig. 4.

Fig. 6 is a vertical section taken along the plane 6—6 indicated in Fig. 5.

Fig. 7 is a vertical section taken along the plane 7—7 indicated in Fig. 5.

Fig. 8 is a longitudinal section through another form of headlight embraced by this invention.

Fig. 9 is a front view of the headlight shown in Fig. 8.

Fig. 10 is a vertical transverse section taken along the plane 10—10 indicated in Fig. 8.

Fig. 11 is a transverse section taken along the plane 11—11 of Fig. 8.

Fig. 12 is a vertical section taken along the plane 12—12 indicated in Fig. 11.

One of the important characteristics of this invention is the provision of an illuminating means which employs but a small emission lens. Whereas headlights of the prior art have employed emission lenses from 6" to about 9" in diameter, the emission lenses of headlights embraced by this invention are preferably 2" or less in diameter. Furthermore, the headlights are preferably of a conical or bullet-like shape and therefore offer but little wind resistance. When two headlights are employed on a vehicle, the two headlights are preferably so arranged that the optical axes will intersect at a suitable distance in front of the vehicle. The headlights may be mounted at any suitable height but preferably they are carried close to the ground and for this reason may either be connected directly to the frame or other relatively low portion of the vehicle.

Various means of connecting the headlights to the vehicle may be employed and for this reason such means of attachment are not described in detail.

As shown in Fig. 4, the headlight comprises a conical housing 10 provided with a rear hemispherical closure member 11 adapted to be connected to the housing 10 in any suitable manner as, for example, by means of an overlapping joint indicated at 12. The edge of the hemispherical closure member 11 is provided with a substantially cylindrical flange portion provided with an internally extending lip adapted to be slipped over a substantially cylindrical portion of the rear edge of the member 10. The closure member 11 is held in contact with the conical member 10 either by friction or by means of suitable bayonet joint connection including a bayonet slot 13 formed in the edge of the closure member 11 and suitable pins 14 carried by the rear edge of the conical member 10.

Suitably supported within the housing 10 as by means of the bracket 15 is a socket 16 adapted to receive an incandescent filament lamp 17. In the rear of said lamp is a suitable reflector 18 suitably attached to the closure member 11 as by means of one or more lugs 19. The reflector 18 may either be parabolic or spherical. When a spherical reflector 18 is employed, the radial center or focal point of said reflector should preferably be slightly in advance of the center of the filament in the filament bulb 17.

In front of the lamp 17 a suitable lens assembly is positioned. Such lens assembly is carried within a sleeve 20 positioned within the housing 10 as by means of a spider 21. Within the sleeve 20 a compound lens system is employed, such lens system including two convex lens portions 22 and 23, together forming a condensing lens system, the focal point of these two lens portions in combination falling close to the center of the filament in the light bulb 17. The lens portions 22 and 23 do not form a complete lens. Slightly less than one-half of such lenses is cut off, and the lens portions 22 and 23 may rest upon a divisional member 24 provided with a non-reflective or light absorbing upper surface and a plated, burnished or mirror-like reflecting lower surface. The lower portion of the lens portion 22 is positioned therebelow as indicated at 22' but the lower portion of the lens 23 need not be employed at all. The lower, cut surfaces of the lens portions is painted with a non-reflecting substance and the divisional member 24 eliminated from between the lens portions if a cheaper and slightly less effective structure is desired. The divisional member 24 is suitably connected to the sleeve 20. A vertical baffle 25 is positioned between the lower edge of the lens member 22' and the source of illumination.

The forward portion of the housing 10 is provided with a suitable aperture 26 adapted to slidably receive a sleeve 27 provided with an outwardly and rearwardly extending lip 28 by means of which the entire sleeve 27 is adjustably positioned on the forward end of the housing 10 as, for example, by means of screws 29. The sleeve 27 carries a spherical lens 30 of such size that the principal focus of said lens 30 falls within the combination of lenses 22 and 23. The lower portion of the lens 30 is cut away and is replaced by a piece of plane glass 31, the lens 30 and the glass 31 being separated by the divisional member 24. If desired, the divisional member 24 may be split, the divisional member portion 24' being carried between the lens 30 and the glass 31 in such position as to overlap the divisional member 24, thereby permitting an adjustment of the sleeve 27 relatively to the sleeve 20 along the optical axis without breaking the continuity of the divisional member or separation. The divisional member 24 is placed at an angle of about 6° to 10° with the optical axis.

In this arrangement, it will be seen that light received by the lens combination 22 and 23 is concentrated upon the emission lens 30 and discharged therefrom in a downwardly direction, the division member 24 preventing any light from being thrown upwardly. Light passing through the lower portion 22' of the lens 22 in the sleeve 20 is either discharged directly and downwardly through the glass 31 or is reflected from the lower burnished side of the partition 24 so as to follow a downward direction. In this manner, no light is discharged upwardly but instead the light is thrown downwardly where it is of value in illuminating the road.

At a distance of 30, 50, or even 200 feet or more from the headlight, a clear line of demarcation exists between the unilluminated upper portion of the field and the intensely illuminated lower portion. The line of demarcation is established by the position of the deflector plate 24. The width of the beam thus thrown is regulated by changing the distance between the emission lens 30 and the condenser lens system within the sleeve 20.

A tube 32 extends from the housing 10 substantially at right angles to the optical axis of the headlight, said tube 32 being connected to the headlight in any suitable manner, provided the axis of the tube 32 is directed towards the filament of the light 17. The reflector 18 is provided with an extension 18' whereby light from the filament of the lamp 17 is thrown into the tube 32. The tube 32 is provided with a downwardly extending tubular member 34 at its outer end, a suitable prism or mirror 35 being positioned within the tube 32 so as to direct light from the filament 17 downwardly through the tube 34. The lower portion of the tube 34 is provided with a rearwardly extending aperture 36 provided with a lens 37. The lower end of the tube 34 is provided with a mirror, prism, or other reflecting surface 38 adapted to receive the light passing through the tube and directed through the lens 37.

The means described immediately hereinabove therefore permit a certain quantity of light from the same source of light as that employed in the headlight to be diverted and conveyed to a point whence such light is directed rearwardly.

As shown in Figs. 1 to 3, the tube 32 extends horizontally from the housing 10 through the fenders of the vehicle and the tubes 34 extend downwardly beneath the fenders, thereby permitting the emission lens 37 to be positioned beneath the fenders and between the fender and the wheel, thus throwing a light rearwardly and downwardly illuminating the lower portions of the vehicle and the ground therebeneath.

It has been found that by illuminating the lower portions of the vehicle and the ground immediately therebeneath, the marginal portions of the car are silhouetted, thus facilitating the operator of an oncoming vehicle to determine the width and precise location of the oncoming car, thereby obviating any possibility of misjudging the distance separating the vehicles in passing.

It will be obvious to those skilled in the art that the length and direction of the various light passages 32, 34 and the like, may be materially varied without departing from this invention, the only essential being that the light is conducted from the headlight to a point beneath the fenders and then directed rearwardly and downwardly. The emission lens may be slightly tilted towards the sides so as to more effectively illuminate the marginal portions of the vehicle as well as the ground slightly outside the marginal edges of the vehicle.

The modified form of headlight shown in Figs. 8 to 12 has been found to have certain advantages over the device illustrated in Figs. 4 to 7. The headlight shown in Figs. 8 to 12 comprises a housing 10', a rear closure member 11', and a front sealing member 40. The housing 10' instead of being conical, is substantially cylindrical. Within the forward portion of the housing there is positioned a block 41 provided with a substantially square aperture 42. A filler block 43 is positioned in the bore of the block 41, the filler block 43 retaining the sleeve 44 containing the lens system. The filler block is connected to the block 41 as by means of a screw 45 positioned in a recess formed in the block 41. The filler block 43 carries a segment 46 of a substantially spherical reflector.

The rear portion of the housing 10' is provided with a spider 47 having a central internally threaded aperture adapted to receive a thumb screw 48 provided with a lock nut 49. The end of the thumb screw 48 is threadedly received in a boss 50 carried by the reflector member 51. The reflector member 51 is provided with a rod 52 slidably extending through an aperture 53 in the spider 47. Rotation of the thumb screw 48 will therefore cause the reflector member 51 to be moved toward or away from the light filament 17 and be fastened in any desired position by the lock nut 49. The filament 17 is held within a suitable socket 54 carried by the housing 10'. A terminal box 55 is attached to the lower portion of the housing 10' said terminal box also acting as a part of the support by means of which the headlight is attached to the vehicle.

The sleeve 44 is provided with a lens system which preferably consists of upper lens portions 22' and 23' resting upon a divisional reflecting member 56. The divisional member 56 is preferably provided with a black non-reflective upper surface and a burnished or mirror-like lower surface. The divisional member 56 is preferably inclined at an angle of between 6° and 10° to the optical axis. The edges of the divisional reflecting member 56 are received in suitable slots 57 and 58 formed in the sides of the square aperture 42 of the block 41.

The sleeve 44 also carries a convex lens member 59 beneath the lens portion 22. The lens portion 59 is inclined so that the axis of the lens 59 makes an angle of between about 12° and 20° to the normal optical axis of the lens portions 22' and 23'.

The forward portion of the headlight shown in Fig. 8 comprises a suitable emission lens 60 above the divisional member or deflector plate 56 and a piece of plane glass 61 beneath the deflector member 56. The lens portion 60 and the glass 61 are retained by means of the forward closure member 40 which preferably should not extend materially beyond the outer surfaces of the lens or glass 60 and 61.

It has been found that by inclining the lens portion 59 as described hereinabove, a lesser amount of light is thrown downwardly immediately in front of the vehicle and instead such light is thrown out in a more horizontal direction, thereby illuminating an area at a greater distance from the light source while the small amount of light which might be directed upwardly is reflected from the lower, mirror-like reflecting surface of the divisional member. Furthermore, inasmuch as the two reflector surfaces 46 and 51 form a substantially continuous reflector enclosing the filament 17, the light emitted by the filament is used in its entirety for useful purposes and no light is lost by absorption or reflection into a non-accessible portion of the headlight. The headlight does not exhibit any glare and merely forms a slightly luminous spot when viewed at an angle. The horizontal line of demarcation is extremely sharp even at distances of 200 feet from the headlight while the road is intensely illuminated.

A person standing in front of the headlight 100 or 200 feet away can look at the light without discomfort, provided his head is above this line of demarcation while the observer's lower limbs would be intensely illuminated.

The terminal box 55 is provided with an aperture 65 opening transversely therefrom and extending into a substantially cylindrical member 66 provided with an internally curving outer lip 67 adapted to engage an outwardly flaring end 68 of a tubular conduit 69, thus forming a universal connection between the tubular conduit 69 and the terminal box 55. A second tubular member 70 is slidably carried upon the conduit 69 so as to form a telescoping joint which may be rendered permanent by means of a set screw 70'. The tubular member 70 is provided with an outwardly extending flange portion 71.

A small light housing 72, rectangular in longitudinal section but having a transverse section such as is shown in Fig. 12, is then inserted through an aperture made in the fender 73 of the vehicle. The housing 72 is preferably provided with an outwardly extending flange portion 74 permitting the housing 72 to be connected to the fender 73 and to the flange 71 of the tubular member 70 as by means of the bolts 75. The housing 72 as shown in Fig. 12, is provided with a semi-cylindrical rear portion adapted to form a reflecting surface 76 and a rectangular portion provided with a window 77. A filament bulb 78 is positioned within the housing 72, said filament bulb being carried in a suitable socket 79 forming a part of the housing 72. An aperture or window 80 is carried in the end of the housing 72. It is to be understood that the window 80 faces outwardly of the vehicle and the window 77 faces rearwardly. A suitable electrical cable extends from the socket 79 of the housing 72 through the tubular members 70 and 69 and through the aperture 65 of the terminal box 55, thus supplying electrical energy to the lamp 78. Electrical current may be supplied to the cable feeding the lamp 78 as well as the lamp 17 as by means of the cable 81 which may pass through the supporting means 82 which support the entire headlight in position on the vehicle.

The construction shown in Figs. 11 and 12 permits the auxiliary light housing 72 to be positioned beneath the fender of a vehicle irrespective of the distance between the fender and the headlight or the angularity of the fender relatively to the vertical plane. The purpose of the auxiliary light housing 72 is to throw a beam of light downwardly and towards the rear of the vehicle from a point beneath the fenders, the window 80 permitting a certain quantity of light to be thrown against the inner surfaces of the wheels, thus definitely silhouetting the lower and marginal edges of the vehicle.

As a result of the construction described hereinabove, there is no glare and the drivers of approaching vehicles are not blinded by the light from the headlights. All of the light is directed below a predetermined plane, such predetermined plane being established by the position of the substantially horizontal but downwardly directed partitions or baffles 24 and 56.

Although two forms of this invention have been described in detail, it is to be understood that numerous changes and modifications could be made without departing from the scope of this invention. All such changes and modifications as come within the scope of the appended claims are embraced thereby.

We claim:

1. In a headlight construction, the combination of a housing, a reflector, a light source, a condenser lens system and an emission lens system in said housing in the order stated, said condenser lens system comprising two upper convex lens segments and one lower convex lens segment, said emission lens system comprising an upper convex lens segment and a lower plane glass portion, and a substantially flat opaque divisional member at an acute angle to the optical axis of the headlight extending from the plane of contact between said upper and lower lens segments of said condensing system to the plane of contact between said lens segment and plane portion of said emission system.

2. In a headlight construction, the combination of a housing, a reflector, a light source, a condenser lens system and an emission lens system in said housing in the order stated, said condenser lens system comprising two upper convex lens segments and one lower convex lens segment, the lower convex lens segment lying at an angle of between 12° and 20° to the optical axis of the headlight, said emission lens system comprising an upper convex lens segment and a lower rectangular plane glass portion, and a substantially flat opaque divisional member at an acute angle to the optical axis of the headlight separating said upper and lower lens segments of said condensing system and said lens segment and plane portion of said emission system, said divisional member extending between said condensing and emission systems.

3. In a headlight construction, the combination of a housing; a reflector, a light source, a condenser lens system and an emission lens system in said housing in the order stated, said reflector having its focus along the optical axis of the headlight and between the center of said light source and condenser lens system, said condenser lens system comprising two upper convex lens segments and one lower convex lens segment, said emission lens system comprising an upper convex lens segment and a lower rectangular plane glass portion, and a substantially flat opaque divisional member at an angle of between 6° and 10° to the optical axis separating said upper and lower lens segments of said condensing system and lens segment and plane portion of said emission system.

4. In a headlight construction, the combination of a housing; a reflector, a light source, a condenser lens system and an emission lens system in said housing in the order stated, said reflector having its focus along the optical axis of the headlight and between the center of said light source and condenser lens system, said condenser lens system comprising two upper convex lens segments and one lower convex lens segment, the lower convex lens segment lying at an angle of between 12° and 20° to the optical axis, said emission lens system comprising an upper convex lens segment and a lower rectangular plane glass portion, and a substantially flat opaque divisional member at an angle of between 6° and 10° to the optical axis separating said upper and lower lens segments of said condensing system and lens segment and plane portion of said emission system.

5. In a headlight construction, the combination of a housing; a reflector, a light source, a condenser lens system and an emission lens system in said housing in the order stated, said condenser lens system comprising a horizontally split convex lens, said emission lens system comprising an upper convex lens segment and a lower rectangular plane glass portion, and a substantially flat opaque divisional member at an acute angle to the optical axis extending from between said split condenser lens to between the upper convex lens and lower rectangular plane glass portion of said emission system.

DENNIS R. DUPUIS.
ELWIN W. PETERSON.